Patented Nov. 9, 1943

2,333,648

UNITED STATES PATENT OFFICE 2,333,648

TREATMENT OF HYDROCARBONS

Aristid V. Grosse, Bronxville, N. Y., and Carl B. Linn, Chicago, Ill., assignors to Universal Oil Products Company, Chicago, Ill., a corporation of Delaware No Drawing. Application October 28, 1941, Serial No. 416,860

5 Claims. (Cl. 196—10)

This is a continuation-in-part of our co-pending application Serial No. 248,777, filed December 21, 1938, now Patent No. 2,267,730, granted December 30, 1941.

This invention relates to a process for treating hydrocarbon mixtures containing organic fluorides to remove fluorine therefrom. More specifically it relates to the treatment of synthetic hydrocarbons produced in the presence of active fluoride catalysts to remove small amounts of organically combined fluorine from fluorine compounds present in admixture with the hydrocarbons. The invention is particularly adapted to the treatment of hydrocarbons produced by alkylation of isoparaffinic hydrocarbons with olefinic hydrocarbons using active fluoride catalysts, including hydrogen fluoride or hydrofluoric acid and mixtures comprising substantially hydrogen fluoride and boron fluoride.

The alkylation of branched chain paraffinic hydrocarbons such as isobutane and isopentane with olefinic hydrocarbons to produce saturated liquid hydrocarbons utilizable as gasoline motor fuels with high antiknock properties, is a recent development which is beginning to assume commercial importance. By this means relatively low-boiling isoparaffinic hydrocarbons may be alkylated with low-boiling olefins, thereby converting materials which have relatively low commercial value into more valuable hydrocarbons with high antiknock values, said hydrocarbons being particularly useful as components of aviation gasoline.

Active fluoride catalysts including hydrogen fluoride or hydrofluoric acid and mixtures comprising essentially hydrogen fluoride and boron trifluoride are used in the alkylation of isoparaffins by olefins, but it has been found that the resultant alkylation product frequently contains minor quantities of fluorine in combination with the hydrocarbons, possibly due to interaction of hydrogen fluoride with olefinic constituents of the reaction mixture. Boron fluoride assists hydrogen fluoride in catalyzing the alkylation of an isoparaffin by ethylene, but in this case also the product contains small quantities of fluorides as do those formed in the presence of hydrogen fluoride from an isoparaffin and an olefin of higher molecular weight than ethylene.

Although the fluorine content of the hydrocarbon product of gasoline boiling range is rarely very high, the presence of fluorine is undesirable both from the standpoint that the combustion products of such a fuel are extremely corrosive, as well as the fact that its antiknock value, generally expressed by the term "octane number," is considerably reduced either when the gasoline is used as such, or when a small amount of an anti-detonating agent as lead tetraethyl is added thereto. Thus it may be shown that gasoline fractions containing as much as 0.1% by weight of fluorine have inferior antiknock properties particularly as concerns their response to additions of lead tetraethyl as compared to the otherwise same gasoline which contains substantially no fluorine compounds. The present invention offers a method for reducing the fluorine content of the hydrocarbon alkylation product to a point where this adverse effect is no longer substantial.

In one specific embodiment the present invention comprises a process for treating hydrocarbons produced by catalytic alkylation of isoparaffins in the presence of an active fluoride catalyst which comprises treating said hydrocarbons with substantially anhydrous aluminum trifluoride under dehydrofluorinating conditions of temperature and pressure, and recovering the treated hydrocarbons.

According to this invention the fluorine-containing liquid hydrocarbon product from alkylation in the presence of a catalyst containing hydrogen fluoride is contacted with substantially anhydrous granular aluminum fluoride at a temperature generally above 100° C. and preferably at about 300° C. when using a liquid space velocity of between about 1 and 5 but under conditions such that substantially no decomposition of the alkylation product occurs due to cracking or to other undesirable reactions. At higher temperatures, which generally do not exceed 400° C., higher space velocities are employed. The term "space velocity" refers to the volume of liquid hydrocarbon product charged per volume of aluminum fluoride per hour. The pressure employed during defluorination may be atmospheric, subatmospheric, or superatmospheric, the last named being used mainly in the interest of increasing the plant treating capacity even though the reaction is favored by lower pressures.

The catalyst for the present process is utilized in the form of powder, granules, or particles of definite size and shape formed by mechanical means. A preferred catalyst is produced by mixing about 95% by weight of anhydrous aluminum fluoride powder with about 5% by weight of powdered graphite and forming the mixture into pellets by a pelleting machine. Before being used in the process, the catalyst is generally dried and calcined, preferably in a stream of dry, substantially inert gas as hydrogen, nitrogen, or air at a temperature in the approximate range of the treating temperatures.

We have found that alkyl fluorides as such or dissolved in hydrocarbons, including those produced by alkylation in the presence of active fluoride catalysts, are converted into substantial amounts of olefins and hydrogen fluoride by contact with aluminum fluoride under the above indicated treating conditions. In order to prevent substantial re-combination of hydrogen fluoride with said olefins, the product recovered from the aluminum fluoride treatment is quickly treated further to remove hydrogen fluoride. For example, the mixture containing the olefin and hydrogen fluoride is passed over solid granular sodium fluoride or potassium fluoride, each of which forms with hydrogen fluoride an addition compound of the type NaF·HF. The olefin so liberated in the paraffinic alkylation product usually represents only a very small proportion of the total dehydrofluorinated product. If desired hydrogen fluoride may be recovered from the double salt by heating and it may then be utilized further as catalyst for the hydrocarbon alkylation reaction. Other means of removing hydrogen fluoride include washing the treated product with water, a solution containing an alkali, or with a solution containing a salt which will react with hydrogen fluoride to produce an insoluble or non-volatile fluoride.

The process of this invention is also utilizable for converting alkyl fluorides into hydrogen fluoride and olefins or for converting a mixture of alkyl fluorides into a mixture of olefins.

The following example is given to show results obtainable in the operation of the process but should not be considered as unduly limiting the broad scope of the invention.

A substantially butane-free hydrocarbon product formed by alkylation of isobutane with isobutene at 25° C. in the presence of anhydrous hydrogen fluoride and containing 0.13% by weight of fluorine, is passed under atmospheric pressure through a nickel tube containing aluminum fluoride catalyst in the form of 3 x 3 mm. pellets maintained at 300° C. When the fluorine-containing alkylation product is charged at an hourly liquid space velocity of 2, the hydrocarbon product recovered in 97% yield contains 0.02% by weight of fluorine.

The character of the present invention and particularly its practical value are evident from the preceding specification and example given, although neither section is intended to unduly limit its generally broad scope.

We claim as our invention:

1. A process for purifying a normally liquid hydrocarbon mixture containing as an impurity a relatively small percentage of organically combined fluorine to remove fluorine therefrom, which comprises treating said mixture with substantially anhydrous aluminum fluoride.

2. A process for purifying a normally liquid hydrocarbon mixture containing as an impurity a relatively small percentage of organically combined fluorine which comprises contacting said mixture with substantially anhydrous aluminum fluoride at a temperature adequate to remove fluorine therefrom.

3. A process for purifying a normally liquid hydrocarbon mixture containing as an impurity a relatively small percentage of organically combined fluorine and produced by the alkylation of an isoparaffin with an olefin of higher molecular weight than ethylene in the presence of hydrogen fluoride, which comprises contacting said mixture with substantially anhydrous aluminum fluoride under treating conditions of temperature and pressure adequate to remove fluorine therefrom.

4. A process for purifying a normally liquid hydrocarbon mixture containing as an impurity a relatively small percentage of organically combined fluorine which comprises contacting said mixture with substantially anhydrous aluminum fluoride at a temperature of from about 100° to about 400° C. to remove fluorine therefrom.

5. A process for purifying a normally liquid hydrocarbon mixture containing as an impurity small amounts of organically combined fluorine which comprises contacting said mixture with a composite comprising essentially about 95% by weight of anhydrous aluminum fluoride and about 5% by weight of graphite at a temperature adequate to remove fluorine therefrom.

ARISTID V. GROSSE.
CARL B. LINN.